United States Patent [19]

Sue

[11] 4,025,066
[45] May 24, 1977

[54] SHEET FEED DEVICE FOR A FACSIMILE SYSTEM

[75] Inventor: Takaji Sue, Tokyo, Japan

[73] Assignee: Ricoh Co., Ltd., Tokyo, Japan

[22] Filed: Jan. 14, 1976

[21] Appl. No.: 648,871

Related U.S. Application Data

[63] Continuation of Ser. No. 507,144, Sept. 18, 1974, abandoned.

[30] Foreign Application Priority Data

Sept. 29, 1973  Japan ............................ 48-109583

[52] U.S. Cl. ................................. 271/9; 271/118; 271/125; 271/127; 271/160; 271/164; 271/170

[51] Int. Cl.² .................... B65H 3/44; B65H 1/12

[58] Field of Search .............. 271/9, 157, 158, 159, 271/160, 162, 164, 170, 171, 127, 118, 117, 125, 124

[56] References Cited

UNITED STATES PATENTS

| | | | |
|---|---|---|---|
| 3,047,290 | 7/1962 | Thomsen | 271/125 X |
| 3,153,535 | 10/1964 | Gericke | 271/9 |
| 3,265,384 | 8/1966 | Shute | 271/118 X |
| 3,273,883 | 9/1966 | Baronnie | 271/9 |
| 3,599,966 | 8/1971 | Del Vecchio et al. | 271/9 |
| 3,635,159 | 1/1972 | Keeler et al. | 271/9 X |
| 3,806,112 | 4/1974 | Melby et al. | 271/127 X |

Primary Examiner—Johnny D. Cherry
Assistant Examiner—Bruce H. Stoner, Jr.
Attorney, Agent, or Firm—Cooper, Durham, Clark, Griffin & Moran

[57] ABSTRACT

Improvements in a sheet feed device for a facsimile system for selectively supplying an original copy and a recording sheet to the rotating drum. A cassette adapted to be placed on a cassette table comprises two trays adapted to move relative to each other, one tray for supporting thereon a stack of original copies and the other tray for supporting thereon a stack of recording sheets. One of the two trays is selectively brought to a position in which it is disposed below a friction roller for picking up the uppermost sheet of the stack of original copies or recording sheets. Means is provided for lifting the two trays to bring the uppermost sheet into frictional engagement with the roller.

10 Claims, 8 Drawing Figures

SHEET FEED DEVICE FOR A FACSIMILE SYSTEM

This is a continuation, of application Ser. No. 507,144 filed Sept. 18, 1974, now abandoned.

BACKGROUND OF THE INVENTION

This invention relates to sheet feed devices, and more particularly it is concerned with a sheet feed device for a facsimile system.

In a facsimile system in which a graphic material fixed on a rotating drum is scanned, a scanning head is moved axially while an original copy or a recording sheet is fixed on the drum rotating in a predetermined direction, so that scanning of the graphic material can be carried out. Transmission and reception of a facsimile record of the original copy can be carried out by converting into electric signals the picture elements obtained by scanning.

When a sheet is fed to a rotating drum and mounted thereon automatically, either a stack of original copies or a stack of recording sheets should be piled on a tray as required. This operation is troublesome.

To obviate this disadvantage, proposals have been made to use separate sheet feed trays for original copies and recording sheets which are selectively mounted on the system as occasion demands. This also involves the troublesome operation of changing the sheet feed trays. Proposals have been made to use a roll of recording sheet which is paid out and cut into a predetermined length and fed to the drum upon receipt of electric signals. This has the disadvantage of having to use a device of complex mechanism.

SUMMARY OF THE INVENTION

This invention has as its object the provision of a sheet feed device for a facsimile system in which a sheet feed tray for supporting thereon a stack of original copies and another sheet feed tray for supporting thereon a stack of recording sheets are constructed as a unit and can be detachably mounted on the main body of the facsimile system, whereby switching between the original copies and recording sheets to be fed to the rotating drum can be effected readily.

DESCRIPTION OF A PREFERRED EMBODIMENT

Figure 1:
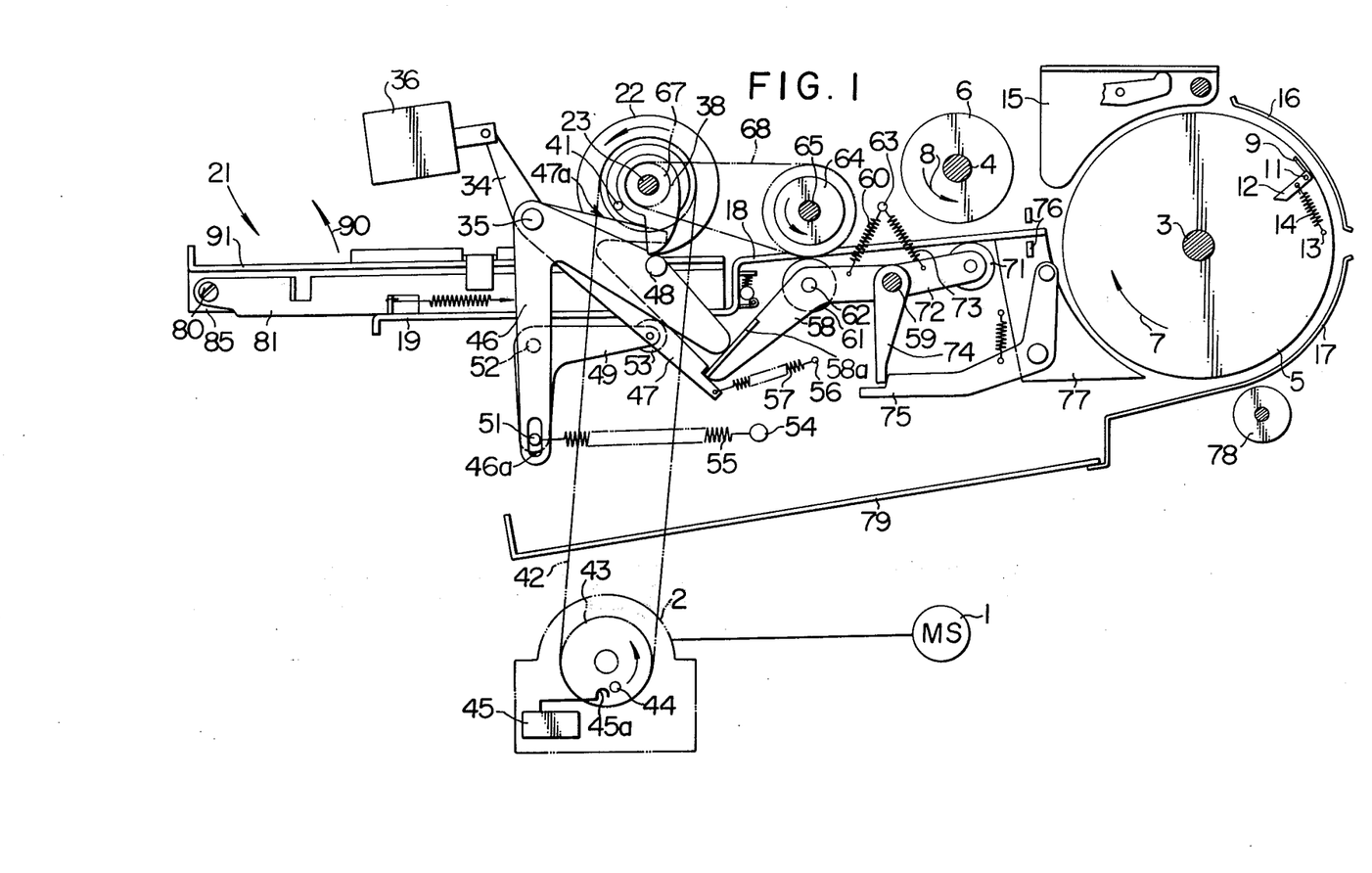
FIG. 1 is a side view of the sheet feed cassette and a part of the sheet feed means comprising one embodiment of the present invention.

A preferred embodiment of the invention will now be described with reference to the accompanying drawings. In FIG. 1, there is shown a main switch 1 which is actuated to rotate a main motor (not shown) and a separator motor 2. Rotation of the main motor causes a drum 5 and 6 sheet feed roller mounted on an immovable member (not shown) by shafts 3 and 4 to rotate in the directions of arrows 7 and 8 respectively.

Secured to one side of a grip claw means 9 adapted to be brought into pressing engagement with outer periphery of the drum 5 is an arm 12 which is pivotally supported by one side wall of the drum 5 through a shaft 11. The arm is normally urged to move counter-clockwise in FIG. 1 by the biasing force of a compression spring 14 connected at one end to the arm and at the other end to a pin 13 affixed to the side wall of the drum 5.

Arranged around the outer periphery of the drum 5 are guide plates 15, 16, and 17 which are adapted to keep the trailing end portion of a sheet mounted on the outer periphery of the drum from being separated a great distance from the outer periphery. A guide plate 18 for guiding a sheet in its movement and a cassette table 19 formed integrally with the guide plate 18 are disposed leftwardly of the drum 5. A cassette generally designated 21 is placed on the cassette table 19.

Figure 2:
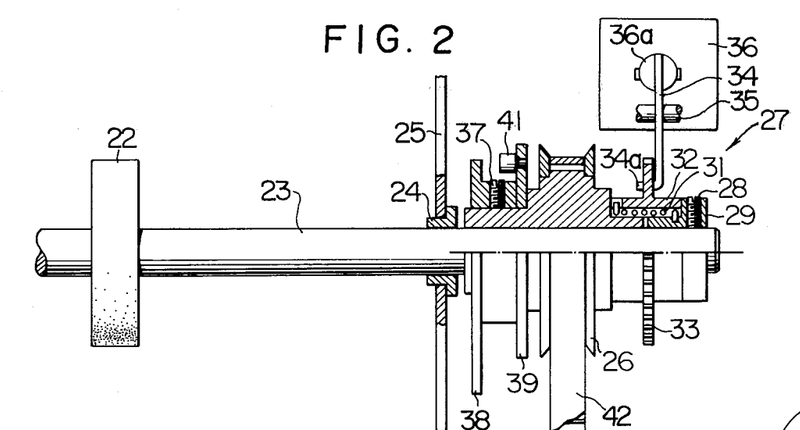
FIG. 2 is a front view of the clutch means, shown partly in section.

A first separator roller 22 is arranged above a front end portion (right end portion in FIG. 1) of the cassette 21 and secured to a shaft 23 which is rotatably supported at opposite ends thereof by side walls 25 (only one side wall is shown) through bearings 24 as shown in FIG. 2. In FIG. 2, a timing pulley 26 is rotatably mounted on an end portion of the shaft 23 extending outwardly through the side wall 25, and spring clutch means generally designated 27 is arranged at the end portion of the shaft 25 and disposed outwardly of the timing pulley 26. The spring clutch means 27 comprises a stopper 29 firmly secured to the shaft 23 through a screw 28, a spring 31 wound on the stopper 29 and one portion of a boss of the timing pulley 26, and a sleeve 32 enclosing the spring 31. The spring 31 is connected at one end to the stopper 29 and at the other end to a hole formed in the sleeve 32.

Formed integrally with the sleeve 32 is a ratchet wheel 33 with which a pawl 34a of a locking member 34 is adapted to come into engagement. The pawl 34a is normally out of engagement with the ratchet wheel 33, so that the spring clutch means 27 is in an on-position in which it permits rotation of the timing pulley 26 to be transmitted to the shaft 23. The locking member 34 which has the pawl 34a secured to one end is pivotally supported by a shaft 35 secured to the side wall 25 and pivotally connected at the other end to an actuator 36a of a release solenoid 36 affixed to an immovable member (not shown). Secured to the other portion of the boss of the timing pulley 26 by a screw 37 is a sheet feed cam 38 which is adapted to bring a stack of sheets in the cassette 21 into pressing engagement with the first separator roller 22 when the cam 38 rotates. A pin 41 for releasing the first separator roller 22 from engagement with the stack of sheets in the cassette 21 is affixed to a holding plate 39 which is formed integrally with the cam 38.

A timing belt 42 is trained at one end about the timing pulley 26 and at the other end to another timing pulley 43 secured to a shaft of the separator motor 2 as shown in FIG. 1. A pin 44 (See FIG. 1) affixed to the pulley 43 is adapted to press an actuator 45a for a switch 45 disposed in the path of movement of the pin 44 so as to interrupt the rotation of the separator motor 2.

Figure 7:
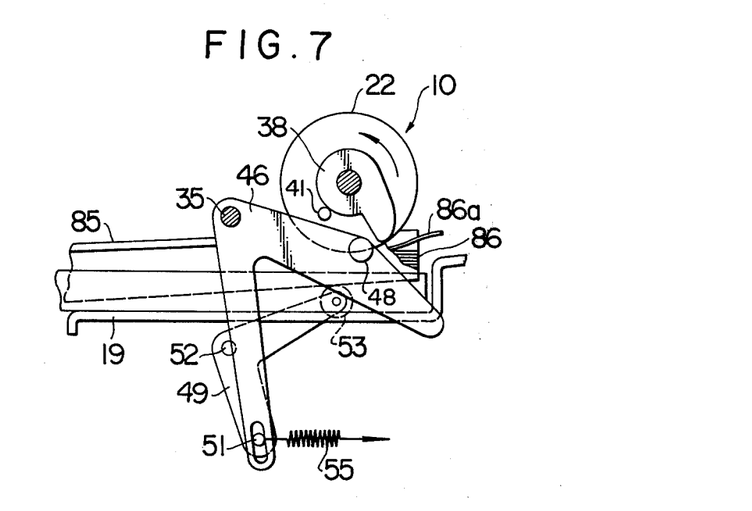
FIGS. 7 and 8 are views in explanation of the operation of the sheet feed means shown in FIG. 1.
Figure 8:
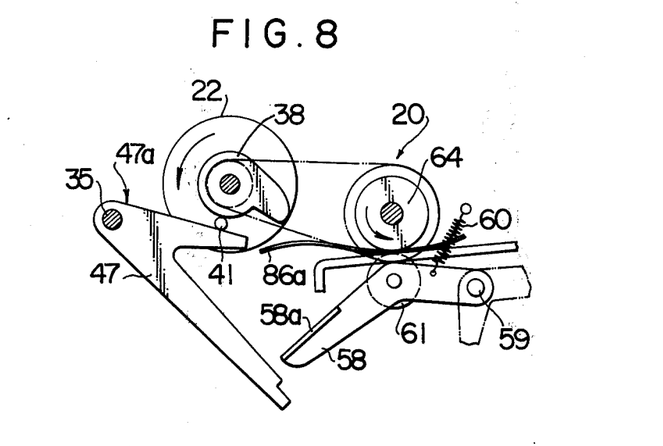

As shown in FIG. 1, FIG. 7 and FIG. 8, a follower 46 and a locking member 47 which are of the double-arm type are pivotally supported at their bases by the shaft 35 which pivotally supports the locking member 34 as described with reference to FIG. 2. A pin 48 affixed to one arm of the follower 46 is maintained in engagement with a major diameter portion of the sheet feed cam 38 as shown in FIG. 1. A slot 46a formed in the other arm of the follower 46 receives therein a pin 51 affixed to one end portion of an actuating member 49 which is pivotally connected to an immovable member (not shown) through a shaft 52. The actuating member 49 supports at the other end thereof rollers 53 which are positioned against the underside of a first sheet feed tray subsequently to be described which is disposed in the cassette 21.

The actuating member 49 is urged to move counter clockwise in FIG. 1 by the biasing force of a compression spring 55 connected at one end to the pin 51 and at the other end to an immovable pin 54. However, since the pin 48 affixed to the follower 46 is in engagement with the sheet feed cam 38 as aforesaid, the counter-clockwise movement of the actuating member 49 is precluded in FIG. 1.

The locking member 47 is urged to move counter-clockwise by the biasing force of a spring 57 connected at one end to one arm of the member 47 and at the other end to an immovable pin 56. However, the counter clockwise movement of the member 47 is precluded by a free end of the arm of the member 47 maintained in pressing engagement with a bent portion 58a of a support lever 58. The lock member 47 includes a side edge 47a of the other arm which cooperates with the release pin 41.

The support lever 58 pivotally connected at its base to a fixed shaft 59 has secured thereto through a shaft 62 a fixing member 61 which may be in the form of a roller. The support lever 58 is urged to move clockwise in FIG. 1 by the biasing force of a compression spring 60 connected at one end to an immovable pin 63 and at the other end to the lever 58. However, the clockwise movement of the support lever 58 is precluded by the bent portion 58a thereof maintained in pressing engagement with an offset portion of the locking member 47. Disposed above the fixing member 61 is a second separator roller 64 which is secured to a shaft 65 rotatably supported by an immovable member (not shown). A chain 68 is trained about a sprocket wheel 66 secured to shaft 65 and a sprocket wheel 67 secured to shaft 23.

An actuating lever 72 having a roller 71 rotably supported at its free end is secured at its base to the shaft 59 pivotally supporting the support lever 58. The actuating lever 72 is urged to move counter-clockwise in FIG. 1 by the biasing force of a compression spring 73 connected at one end to the pin 63 and at the other end to the lever 72. An arm 74 is secured at its base to one end portion of shaft 59 and includes a free end which is maintained in pressing engagement with an offset portion of a locking member 75 by virtue of the biasing force of spring 73. The locking member 75 is adapted to release the arm 74 from engagement therewith when the grip claw means 9 has moved to a predetermined position when a sheet feed operation is performed, thereby bringing the roller 71 into pressing engagement with the sheet feed roller 6. The guide plate 18 has at its front end portion detection means 76 for detecting a leading end portion of a sheet fed from the cassette 21, while a pick-off member 77 for stripping a sheet from the outer periphery of the drum 5 is affixed to the underside of the guide plate 18. A pressing roller 78 disposed below the drum 5 is adapted to be brought into pressing engagement with the outer periphery of the drum 5 when the sheet is discharged so as to eject the sheet from the drum onto an ejected sheet receiving tray 79.

Figure 3:
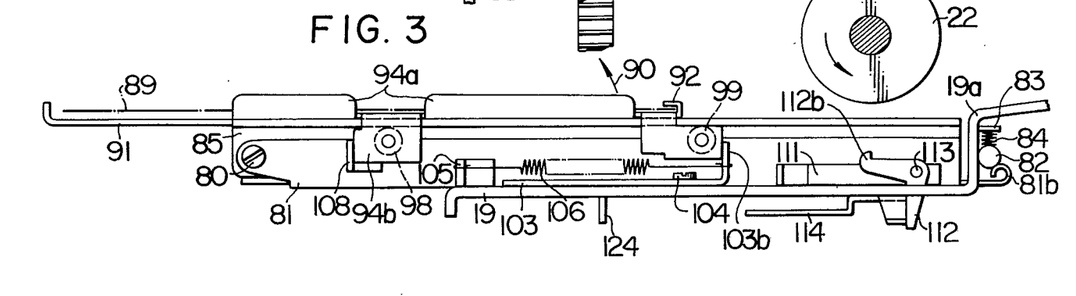
FIG. 3 is a side view of the cassette.
Figure 5:
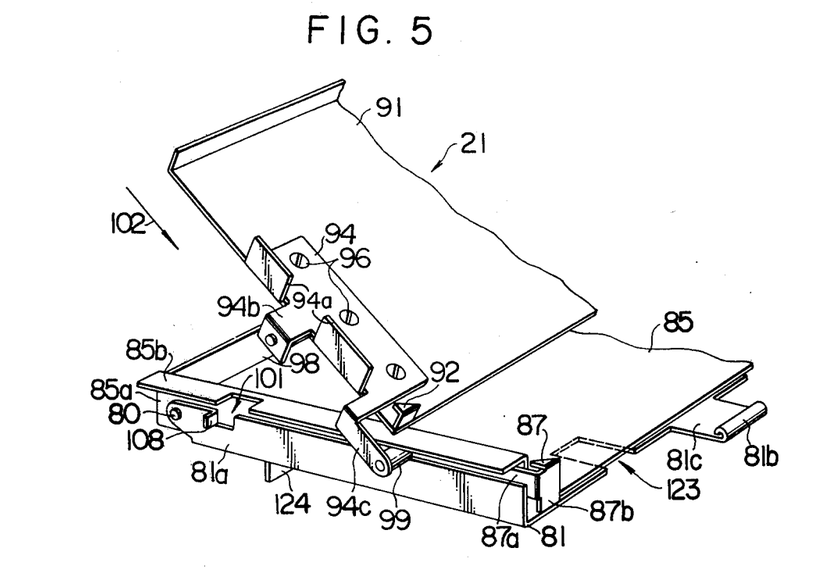
FIG. 5 is a perspective view of the cassette.

Referring to FIG. 5, the cassette 21 comprising a support plate 81 which is formed at its front end with a projecting portion 81c formed at its free end with a tubular portion 81b. By causing the projecting portion 81c to extend through an opening (not shown) formed in a rise portion 19a of the table 19 and by bringing the tubular portion 81b into pressing engagement with a locking member 82 as shown in FIG. 3, the support plate 81 can be fixed on the table 19. The locking member 82 is urged to move downwardly in FIG. 3 by the biasing force of a spring connected at one end to the member 82 and at the other end to an arm 83 affixed to the rise portion 19a.

Figure 4:
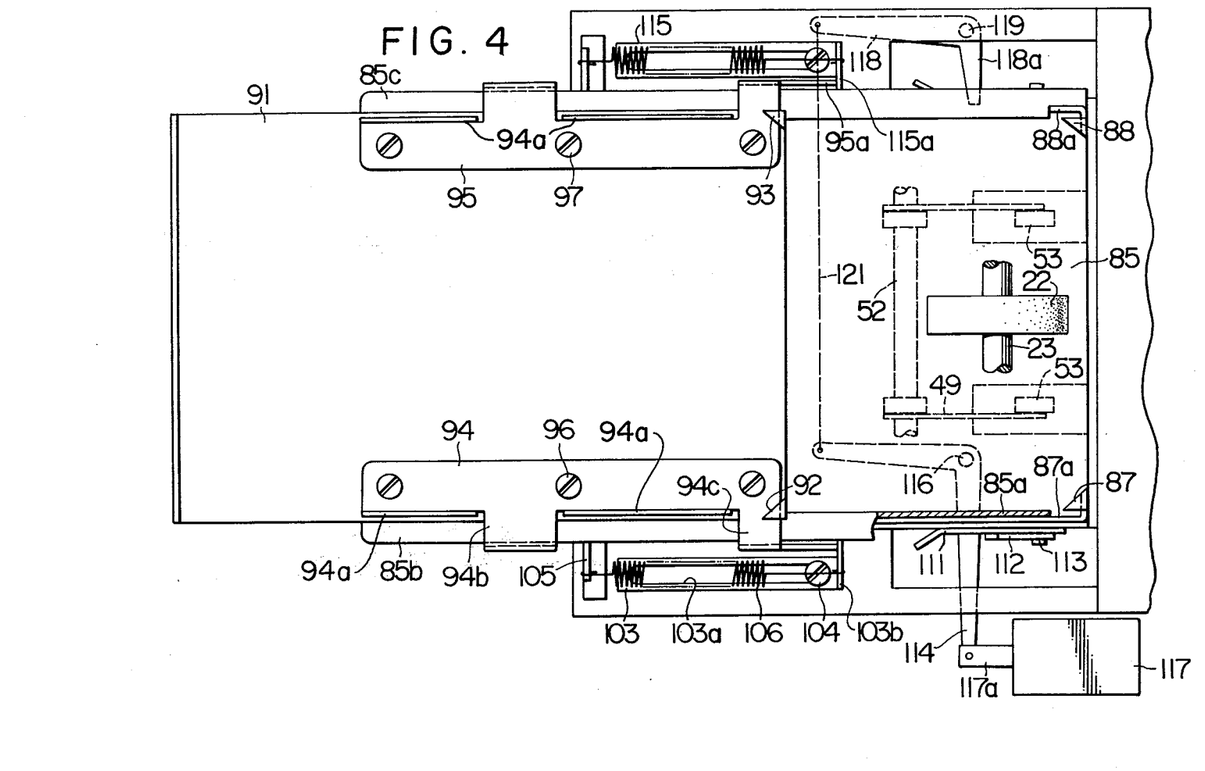
FIG. 4 is a plan view of the cassette.

Referring to FIG. 4 and FIG. 5, corner separators 87 and 88 which are adapted to press against opposite corners of leading ends of recording sheets 86 piled in a stack on the tray 85 as shown in FIG. 7 are arranged at a front end portion of a first sheet feed tray 85 placed on the support plate 81. The corner separators 87 and 88 are each formed at a free end of one of levers 87a and 88a which are pivotally connected at their bases (not shown) to two side plates 85a (only one is shown) of the first sheet feed tray 85. The corner separators 87 and 88 have legs which are disposed, as shown in FIG. 5, on the support plate 81, and are normally spaced apart from the front end of the first sheet feed tray 85.

Upper portions of two side plates 85a of the first sheet feed tray 85 are bent to provide guide plates 85b and 85c. A second sheet feed tray 91 on which original copies 89 are piled in a stack as shown in FIG. 3 rests on the guide plates 85b and 85c. The second sheet feed tray 91 has affixed to opposite corners of its front end corner separators 92 and 93 of a relatively small height. Mounting plates 94 and 95 are secured by screws 96 and 97 to opposite sides of the second sheet feed tray respectively (See FIG. 4).

Referring to FIG. 5 and FIG. 3, the mounting plate 94 is formed with upwardly bent portions 94a which are adapted to arrange all the original copies 89 in the same vertical plane at one side thereof. The mounting plate 94 is also formed therein with arm portions 94b and 94c which have rollers 98 and 99 attached thereto respectively and normally maintained in engagement with the underside of the guide plate 85b. Thus, the second sheet feed tray 85 two guide plates 85a and 85c of the first sheet feed tray 85 and can be moved to right and left in FIG. 3.

As shown in FIG. 5, the guide plate 85b is formed therein with a cutout 101. By releasing roller 98 from engagement in the cutout 101, it is possible to bring the second sheet feed tray 91 to an inclined position as shown in the figure. This permits the recording sheet 86 to be readily fed moved in the direction of an arrow 102 to the first sheet feed tray 85. The first sheet feed tray 85 is pivotally supported at its base i.e., its rear end portion by side plates 81a, 81a of the support plate 81 through a shaft 80. When a sheet feed operation is performed, the two sheet feed trays 85 and 91 can swing about the shaft 80 in the direction of an arrow 90 (see FIG. 1 and FIG. 3).

Figure 6:
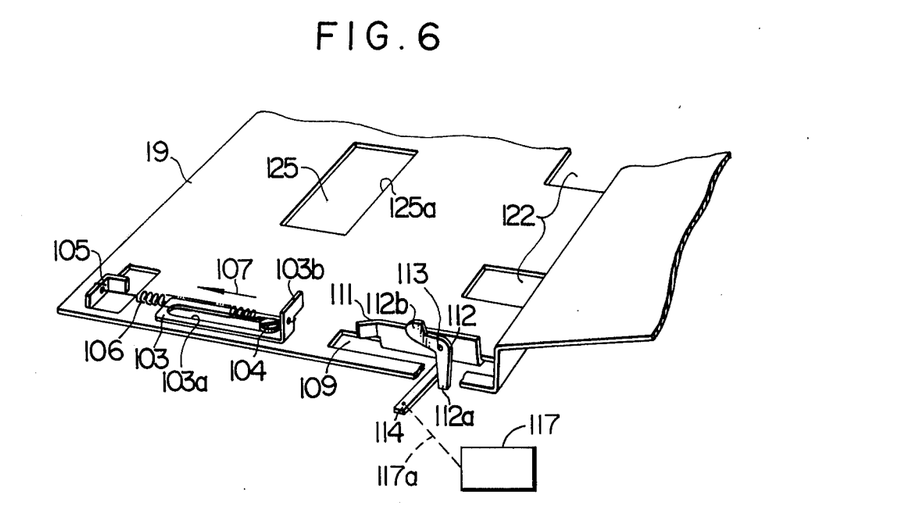
FIG. 6 is a perspective view of the cassette table.

Referring to FIG. 4 and FIG. 6, slide members 103 arranged on opposite sides of the table 19 (only one member 103 is shown) are secured to the cassette table 19 through stepped screws 104 and each can slide along a slot 103a formed therein or to right and left in FIG. 3. Each slide member 103 is urged to move in the direction of an arrow 107 in FIG. 6 by the biasing force of a compression spring 106 connected at one end to an upright portion 105 formed by shaving in the table 19 and at the other end to a bent portion 103b of the member 103. The arm 94c of the mounting plate 94 is positioned at its free end against the bent portion 103b of the slide member 103, and the second sheet feed tray 91 urged to move in the direction of the arrow 107 by the biasing force of spring 106. However, the aforementioned movement of the slide member 103 is precluded by the arm 94b of the mounting plate 94 maintained in pressing engagement with an upright portion 108 formed by shaving in the side plate 81a of the support plate 81 as shown in FIG. 3.

Referring to FIG. 6, an upright portion 111 formed in the cassette table 19 by forming an opening 109 serves as a guide when the cassette 21 is mounted on the cassette table 19. A locking member 112 is pivotally connected to the upright portion 111 through a shaft 113. The locking member 112 which is urged to move clockwise about shaft 113 in FIG. 3 by the biasing force of a spring (not shown) includes a leg portion 112a which is maintained in pressing engagement with one side edge of a release lever 114 as shown in FIG. 6. The locking member 112 is intended to lock the bent portion 103b of the slide member 103 by an offset portion 112b when the slide member 103 moves in a direction opposite to the direction of the arrow 107. A lock member similar to the lock member 112 is arranged at the opposite side of the table 19 to perform the function of locking a bent portion 115a of a slide member 115 (See FIG. 4).

Referring to FIG. 4, the release lever 114 is pivotally connected to the underside of the table 19 through a shaft 116 and has one arm which is pivotally connected to an actuator 117a of a solenoid 117. A similar release lever 118 is pivotally connected to the underside of the table 19 through a shaft 119 and includes one side edge 118a with which a leg of a locking member (not shown) is maintained in pressing engagement. The other end of the release lever 114 is connected to the other end of the release lever 118 through a connecting member 121.

As shown in FIG. 6, openings 122, 122 are formed in the table 19, while openings 123, 123 are formed in the support plate 81 of the cassette 21 as shown in FIG. 5 the openings 122, 122 being aligned with the respective openings 123, 123. The rollers 53, 53 (See FIG. 1, & 4) of the actuation member 49 extend through the openings 122, 122 and 123, 123 and perform the function of raising the bottom of the first sheet feed tray 85. A leg 124 is affixed at its base to the underside of the support plate 81 of the cassette 21. When the cassette 21 is mounted on the table 19, the leg 124 is made to extend through an opening 125 (See FIG. 6) formed in the table 19 and brought into pressing engagement with one side edge 125a of the opening 125 by the biasing force of the locking spring 84 (See FIG. 3). By this arrangement, the cassette 21 is firmly maintained in position on the cassette table 19.

When it is desired to mount one of the recording sheets 86 (See FIG. 7) on the drum 5, the second sheet feed tray 91 on which the original copies 89 are piled moves leftwardly as shown in FIG. 3 and FIG. 4 and the leading end portion of the uppermost recording sheet 86 is positioned below the first separator roller 22. If it is desired to mount one of the original copies 89 on the drum 5, the end can be attained by manually pushing the second sheet feed tray 91 rightwardly. More specifically, the slide members 103 and 105 move rightwardly as they are pushed by the arms 94c which are integral with the second sheet feed tray 91, and the bent portions 103b thereof are engaged by the offset portions 112b of the locking members 112, thereby locking the slide members. This brings the uppermost original copy 89 on the second sheet feed tray 91 to a position in which it is disposed below the first separator roller 22.

Let us assume that the cassette 21 is in the state shown in FIG. 3 and one of the recording sheets 86 is ready to be fed to the drum 5. Upon actuation of the main switch 1 shown in FIG. 1, the main motor and the separator motor 2 begin to rotate, with the rotation of the main motor causing the drum 5 and the sheet feed roller 6 to rotate in the directions of the arrows 7 and 8 respectively.

On the other hand, the spring clutch means 27 shown in FIG. 2 is normally in an on-position as aforesaid, so that rotation of the separator motor 2 and the timing pulley 26 is transmitted through the cluch 27 to shaft 23. This rotates the separator roller 22 and the sheet feed cam 38 to rotate in the direction of the arrow. Rotation of the sheet feed cam 38 releases pin 48 from engagement with the major diameter portion of the cam 38 and brings the same into engagement with its minor diameter portion, so that the follower 46 moves counter-clockwise about shaft 35 in FIG. 1. This movement of the follower 46 is transmitted through pin 51 to the actuating member 49 which moves counter-clockwise as shown in FIG. 7. As a result, the roller 53 bears against the underside of the first sheet feed tray 85 and raises the same. As the first sheet feed tray 85 is brought to the inclined position shown in the figure, the uppermost copy sheet 86a on the table is brought into pressing engagement with outer periphery of the first separator roller 22 and fed from the tray 85.

Further movement of the sheet feed cam 38 causes the pin 41 which acts as a unit with the cam 38 to bear against an upper side edge 47a of the locking member 47 as shown in FIG. 8 so as to move the member 47 clockwise about shaft 35. Clockwise movement of the locking member 47 releases the support lever 58 which is moved clockwise by the biasing force of spring 60, so that the recording sheet 86a is brought into pressing engagement with outer periphery of the second separator roller 64 through the fixing member 61. When only one copy sheet is delivered from the first sheet feed tray 85, the sheet 86a is moved further rightwardly by the second separator roller 64 toward the drum 5.

However, when the operation of separating one sheet from the stack of copy sheets by a first separator mechanism 10 (See FIG. 7) comprising the first separator roller 22 cooperating with the corner separators 87 and 88 (See FIG. 4) is not performed successfully and two recording sheets 86 are delivered from the first sheet feed tray 85, the recording sheet 86 which is directly brought into engagement with the second separator roller 64 is moved rightwardly by the roller 64 while the movement of the recording sheet 86 underlying the recording sheet directly brought into engagement with the roller 64 is interrupted by the frictional dragging of the fixing member 61 thereon. Thus, the sheet separation operation is performed again by a second separator mechanism 20 (See FIG. 8) comprising the second separator roller 64 and the fixing member 61. This ensures that only one recording sheet 86a is fed to the drum 5.

Upon the leading end of the recording sheet 86a delivered from the first sheet feed tray 85 being detected by the detector means 76, the solenoid 36 is energized to move the locking member 34 counter-clockwise in FIG. 1. This brings the pawl 34a (See FIG. 2) into engagement with the ratchet wheel 33 to bring the spring clutch means 27 to an off-position. As a result, transmission of the rotation of separator motor 2 to the first separator roller 22 and second separator roller 64 is interrupted, so that the recording sheet 86a becomes stationary in a predetermined position on the guide plate 18 as the rollers 22 and 64 stop rotating. Even if rotation of the rollers 22 and 64 is interrupted, the sheet feed cam 38 further moves and the pin 44 affixed to the timing pulley 43 presses the actuator 45a to actuate the switch 45. Actuation of the switch 45 interrupts rotation of the separator motor 2, with the sheet feed cam 38 stopping in the initial position shown in FIG. 1. This brings the follower 46 and the actuation member 49 to their original positions, so that the first sheet feed tray 85 is restored to its original position in which the stack of recording sheets 86 on the tray 85 is spaced apart from the first separator roller 22.

The grip claw means 9 provided on the drum 5 is adapted to be brought to an open position by an opening and closing mechanism (not shown) when a sheet is fed to the drum 5. When the grip claw means 9 is brought to the predetermined open position, the lock member 75 releases the arm 74. As a result, the roller 71 is moved counter-clockwise in FIG. 1 by the biasing force of spring 73 to extend through an opening (not shown) in the guide plate 18 and to bring the recording sheet 86a standing by into pressing engagement with the outer periphery of the sheet feed drum 6. This delivers the recording sheet 86 to the drum 5. The recording sheet 86 thus delivered to the drum 5 is mounted on the outer periphery of the latter by having its forward end portion gripped by the grip claw means 9 which is simultaneously brought to a closed position.

The recording sheet mounted on the outer periphery of the drum 5 is released from the drum as follows. The grip claw means 9 is brought to its open position and released from engagement with the leading end portion of the recording sheet which is then stripped off the drum 5 by the sheet pick-off member 77, and the pressing roller 78 is brought into pressing engagement with the outer periphery of the drum 5. The recording sheet thus stripped off the drum 5 is ejected onto the sheet discharge tray 79.

When the subject copy of the facsimile system is transmitted, the original copy 89 should be wound on the outer periphery of the drum 5. To this end, the cassette 21 must be brought to a position in which it is ready to feed the original copy 89 to the drum 5. In the system of the prior art, it has hitherto been necessary to remove the stack of recording sheets from the sheet feed tray and place a stack of original copies thereon or replace the sheet feed tray supporting the stack of copy sheets thereon by a sheet feed tray supporting a stack of original copies. This invention obviates the aforementioned trouble and facilitates the switching between recording sheets and original copies by manually pushing the second sheet feed tray 91.

As aforementioned, the rightward movement of the second sheet feed tray 91 in FIG. 3 and FIG. 4 moves the slide members 103 and 105 in sliding motion in the same direction. The sliding movement of the slide members 103 and 105 is interrupted as their bent portions 103b and 115 are brought into abutting engagement with and locked by the corresponding offset portions 112b (only one is shown) of the lock members 112. As a result, the leading end portion of the uppermost original copy of the original copies 89 on the second sheet feed tray 91 is disposed below the first separator roller 22. If the main switch 1 is actuated at this time, the original copy 89 can be automatically fed to and mounted on the outer periphery of the drum 5 in the same process as has been described with reference to the recording sheet 86.

Following the feeding of the original copy 89 to the drum 5, the solenoid 117 (See FIG. 4) is energized when a transmission termination signal is produced. Energization of the solenoid 117 moves the release members 114 and 118 counter-clockwise in FIG. 4 about their fulcrums and moves the lock members 112, 112 (only one is shown) counter-clockwise in FIG. 3. Counter-clockwise movement of the locking member 112 release the respective bent portions 103b and 115b of the slide members 103 and 115. The slide member 103 thus released is restored to its original position shown in FIG. 3 by the biasing force of spring 106. The other slide member 115 is also restored to its original position.

As the slide member 103 and 115 are restored to their original positions, the bent portions 103b and 115b thereof press the arms 94c and 95a respectively so as to thereby return the second sheet feed tray 91 to its initial position shown in FIG. 3 and FIG. 4. By restoring the second sheet feed tray 91 to its original position after the original copy is fed to the drum and by bringing the recording sheets in a position in which they are disposed below the first separator roller 22, the cassette 21 can be brought to a standby position in which it is ready to feed a recording sheet to the drum when it is required to receive electric signals and translate them into a facsimile record of the original copy.

What is claimed is:

1. A sheet feed device for a duplicating system comprising:
   a. a cassette means for holding sheets to be fed in a predetermined direction to said duplicating system, said cassette means including:
      i. a support member;
      ii. a first tray for receiving thereon a first stack of sheets to be fed;
      iii. a pivot means on said support member for supporting said first tray for pivoting about an axis normal to the direction of movement of the sheets fed from the cassette means;
      iv. a second tray for receiving thereon a second stack of sheets to be fed; and
      v. means for slidably mounting said second tray above said first tray for movement between a first and a second position relative to the first tray in the direction of movement of the sheets and for movement by, and in the same direction as, said first tray upon the pivoting thereof, when in said first position, the first stack of sheets on said first tray and the second stack of sheets on said second tray being in substantially overlapping relationship when the second tray is in its first position and the stack of sheets on the second tray being displaced in a direction opposite to the direction of movement of the sheets a distance large enough to expose at least the leading end portions of the sheets on the first tray when the second tray is in its second position;

b. a cassette table attached to said duplicating system for removably receiving and supporting said cassette means thereon;

c. feed means disposed on said duplicating system above said cassette table for contacting an uppermost sheet of the first stack of sheets on said first tray in said cassette means when said second tray is in its second position and for contacting an uppermost sheet of the second stack of sheets on said second tray when said second tray is in its first position, said feed means removing the appropriate uppermost sheets from the cassette means by frictional engagement; and d. lifting means for moving said first tray about said pivot means relative to said support member to bring the appropriate uppermost sheet of the stacks of sheets on said cassette means into frictional engagement with said feed means.

2. A device as claimed in claim 1 wherein said means for slidably mounting said second tray above said first tray comprises means for permitting said second tray to be moved in a swinging motion relative to said first tray so as to permit an additional supply of sheets to be placed on said first tray.

3. A device as claimed in claim 1 further comprising biasing means for urging said second tray to move to the second position by its biasing force, means for locking said second tray in the first position against the biasing force of said biasing means, and means for releasing said locking means.

4. A device as claimed in claim 1 further comprising correcting means disposed between said feed means and said duplicating system for correcting the misoperation of said feed means by permitting one sheet to be fed from the cassette means at a time.

5. A device as claimed in claim 1 wherein said second tray accommodates sheets of original documents and said first tray accommodates copy sheets.

6. A sheet feed device for a facsimile system comprising:

a. a cassette means for holding sheets to be fed in a predetermined direction to said facsimile system, said cassette means including:
  i. a support member;
  ii. a first tray for receiving thereon a first stack of sheets to be fed;
  iii. pivot means on said support member for supporting said first tray for pivoting about an axis normal to the direction of movement of the sheets fed from the cassette means;
  iv. a second tray for receiving thereon a second stack of sheets to be fed; and
  v. means for slidably mounting said second tray on said first tray for movement between a first and second position relative to the first tray in the direction of movement of the sheets, the first stack of sheets on said first tray and the second stack of sheets on said second tray being in substantially overlapping relationship when the second tray is in its first position and the stack of sheets on the second tray being displaced in a direction opposite to the direction of movement of the sheets a distance large enough to expose at least the leading end portions of the sheets on the first tray when the second tray is in its second position;

b. a cassette table attached to said facsimile system for removably receiving and supporting said cassette means thereon;

c. feed means disposed on said facsimile system above said cassette table for contacting an uppermost sheet of the first stack of sheets on said first tray in said cassette means when said second tray is in its second position and for contacting an uppermost sheet of the second stack of sheets on said second tray when said second tray is in its first position, said feed means removing the appropriate uppermost sheet from the cassette means by frictional engagement; and d. lifting means for moving said first tray about said pivot means relative to said support member to bring the appropriate uppermost sheet of the stacks of sheets on said cassette means into frictional engagement with said feed means.

7. A device as claimed in claim 6 wherein said means for slidably mounting said second tray on said first tray comprises means for permitting said second tray to be moved in a swinging motion relative to said first tray so as to permit an additional supply of sheets to be placed on said first tray.

8. A device as claimed in claim 6 further comprising biasing means for urging said second tray to move to the second position by its biasing force, means for locking said second tray in the first position against the biasing force of said biasing means, and means for releasing said locking means.

9. A device as claimed in claim 6 further comprising correcting means disposed between said feed means and said facsimile system for correcting the misoperation of said feed means by permitting one sheet to be fed from the cassette means at a time.

10. A device as claimed in claim 6 wherein said second tray accommodates sheets of original documents and said first tray accommodates recording sheets.

* * * * *